(12) United States Patent
Yong et al.

(10) Patent No.: US 10,333,829 B2
(45) Date of Patent: Jun. 25, 2019

(54) SERVICE FUNCTION CHAINING AND OVERLAY TRANSPORT LOOP PREVENTION

(71) Applicant: Futurewei Technologies, Inc., Plano, TX (US)

(72) Inventors: Lucy Yong, Georgetown, TX (US); Donald E. Eastlake, III, Milford, MA (US)

(73) Assignee: Futurewei Technologies, Inc., Plano, TX (US)

( * ) Notice: Subject to any disclaimer, the term of this patent is extended or adjusted under 35 U.S.C. 154(b) by 24 days.

(21) Appl. No.: 15/824,922

(22) Filed: Nov. 28, 2017

(65) Prior Publication Data
US 2018/0152374 A1 May 31, 2018

Related U.S. Application Data

(60) Provisional application No. 62/433,090, filed on Dec. 12, 2016, provisional application No. 62/428,296, filed on Nov. 30, 2016.

(51) Int. Cl.
*H04L 12/705* (2013.01)
*H04L 12/741* (2013.01)
(Continued)

(52) U.S. Cl.
CPC .............. *H04L 45/18* (2013.01); *H04L 45/74* (2013.01); *H04L 47/31* (2013.01); *H04L 67/16* (2013.01); *H04L 69/40* (2013.01)

(58) Field of Classification Search
CPC ......... H04L 45/18; H04L 45/74; H04L 47/31; H04L 67/16; H04L 69/40
See application file for complete search history.

(56) References Cited

U.S. PATENT DOCUMENTS

2009/0043486 A1* 2/2009 Yang .................. G01C 21/3492
701/117
2010/0189118 A1* 7/2010 Nonaka ............... H04L 12/4641
370/401
(Continued)

FOREIGN PATENT DOCUMENTS

| CN | 102185871 A | 9/2011 |
| CN | 105491224 A | 4/2016 |
| CN | 105591768 A | 5/2016 |

OTHER PUBLICATIONS

Quinn, Ed., et al., "Network Service Header (NSH)," draft-ietf-sfc-nsh-27, Oct. 20, 2017, 39 pages.
(Continued)

*Primary Examiner* — Ajay Cattungal
(74) *Attorney, Agent, or Firm* — Conley Rose, P.C.

(57) ABSTRACT

A method implemented by a service function forwarder (SFF) comprises receiving, by a receiver of the SFF, a service chain packet comprising a loop prevention field, the loop prevention field comprising a plurality of bits indicating whether an error has occurred during packet transmission, and determining, by a processor of the SFF, whether to forward the service chain packet based on a value in the loop prevention field being less than a predefined parameter, the predefined parameter based on a number of bits (n) in the loop prevention field.

20 Claims, 10 Drawing Sheets

(51) Int. Cl.
*H04L 12/833* (2013.01)
*H04L 29/08* (2006.01)
*H04L 29/14* (2006.01)

(56) References Cited

U.S. PATENT DOCUMENTS

| | | | |
|---|---|---|---|
| 2011/0022725 A1* | 1/2011 | Farkas | H04L 45/00 709/238 |
| 2011/0280145 A1* | 11/2011 | Itoh | H04L 12/42 370/252 |
| 2013/0163594 A1* | 6/2013 | Sharma | H04L 45/64 370/392 |
| 2013/0329734 A1* | 12/2013 | Chesla | H04L 45/74 370/392 |
| 2014/0334488 A1* | 11/2014 | Guichard | H04L 45/306 370/392 |
| 2014/0362857 A1* | 12/2014 | Guichard | H04L 45/566 370/392 |
| 2015/0026362 A1* | 1/2015 | Guichard | H04L 45/30 709/242 |
| 2015/0222640 A1* | 8/2015 | Kumar | H04L 47/782 370/230 |
| 2015/0326470 A1* | 11/2015 | Chu | H04L 45/122 370/392 |
| 2016/0014016 A1* | 1/2016 | Guichard | H04L 45/04 709/226 |
| 2016/0028640 A1* | 1/2016 | Zhang | H04L 45/306 370/389 |
| 2016/0119226 A1* | 4/2016 | Guichard | H04L 45/00 370/392 |
| 2016/0119253 A1 | 4/2016 | Kang et al. | |
| 2017/0019303 A1* | 1/2017 | Swamy | H04L 41/5041 |
| 2017/0019335 A1* | 1/2017 | Schultz | H04L 43/0876 |
| 2017/0244625 A1 | 8/2017 | Meng et al. | |
| 2017/0310611 A1* | 10/2017 | Kumar | H04L 69/00 |
| 2018/0041420 A1* | 2/2018 | Saad | H04L 45/22 |

OTHER PUBLICATIONS

Halpern, Ed., et al., "Service Function Chaining (SFC) Architecture," RFC 7665, Oct. 2014, 32 pages.
Quinn, Ed., et al., "Network Service Header," draft-ietf-sfc-nsh-10. txt, Sep. 20, 2016, 37 pages.
Machine Translation and Abstract of Chinese Publication No. CN102185871, Sep. 14, 2011, 14 pages.
Machine Translation and Abstract of Chinese Publication No. CN105491224, Apr. 13, 2016, 27 pages.
Foreign Communication From a Counterpart Application, PCT Application No. PCT/CN2017/113575, English Translation of International Search Report dated Jan. 18, 2018, 7 pages.
Foreign Communication From a Counterpart Application, PCT Application No. PCT/CN2017/113575, English Translation of Written Opinion dated Jan. 18, 2018, 4 pages.

* cited by examiner

SERVICE FUNCTION CHAINING AND OVERLAY TRANSPORT LOOP PREVENTION

CROSS-REFERENCE TO RELATED APPLICATIONS

The present application claims priority to U.S. Provisional Patent Application 62/428,296, filed Nov. 30, 2016 by Lucy Yong, et. al., and entitled "Service Function Chaining (SFC) and Overlay Transport Loop Prevention" and U.S. Provisional Patent Application 62/433,090, filed Dec. 12, 2016 by Lucy Yong, et. al., and entitled "Service Function Chaining (SFC) and Overlay Transport Loop Prevention," both of which are incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Service function chaining refers to a service deployment model that applies a sequence of network services to a data flow in a specific order. A service chaining deployment model may insert Open Systems Interconnection (OSI) Layer 4 (L4) to Layer 7 (L7) services in data-forwarding paths between peers. Some examples of L4 to L7 services may include firewalls (FWs), wide area network (WAN) and application accelerations, load balancing (LB), and network address translations (NATs). The L4 to L7 services are commonly provided by dedicated hardware appliances located at a centralized location, for example, at a data center (DC) gateway. Thus, data-forwarding may direct all traffic to traverse through the DC gateway, which may cause a high volume of traffic. The high volume of traffic caused by service function chaining may also cause occasional packet transmission failures that unnecessarily consume network resources.

SUMMARY

In an embodiment, the disclosure includes a method implemented by a service function forwarder (SFF), comprising receiving, by a receiver of the SFF, a service chain packet comprising a loop prevention field, the loop prevention field comprising a plurality of bits indicating whether an error has occurred during packet transmission, and determining, by a processor of the SFF, whether to forward the service chain packet based on a value in the loop prevention field being less than a predefined parameter, the predefined parameter based on a number of bits (n) in the loop prevention field. In some embodiments, the method further comprises incrementing, by the processor, the value in the loop prevention field in response to determining that the value in the loop prevention field is less than the predefined parameter. In some embodiments, the method further includes discarding, by the processor, the service chain packet in response to determining that the value in the loop prevention field is greater than or equal to the predefined parameter. In some embodiments, the predefined parameter is $2^{n-1}$, and wherein the loop prevention field comprises at least two bits, and/or the service chain packet is further encapsulated with an overlay header comprising a Time-To-Live (TTL) field, wherein the TTL field comprises a maximum number of hops that the service chain packet is permitted to travel in an overlay network before being discarded. In some embodiments, the method further includes decrementing a value in the TTL field before transmitting the service chain packet in the overlay network to a next overlay node when the value in the TTL field is greater than 0. In some embodiments, the method further includes discarding the service chain packet at an overlay node when a value in the TTL field is equal to 0.

In an embodiment, the disclosure includes a SFF, comprising a receiver configured to receive a service chain packet comprising a loop prevention field, the loop prevention field comprising a plurality of bits indicating whether an error has occurred during packet transmission, a processor coupled to the receiver and configured to increment a value in the loop prevention field when the value in the loop prevention field is less than a predefined parameter, the predefined parameter being based on a number of bits (n) in the loop prevention field, and a transmitter coupled to the processor and configured to transmit the service chain packet after incrementing the value in the loop prevention field. In some embodiments, a header of the service chain packet comprises the loop prevention field, and/or the predefined parameter is $2^{n-1}$, and wherein the loop prevention field comprises at least two bits, and/or the service chain packet is further encapsulated with an overlay header comprising a Time-To-Live (TTL) field, wherein the TTL field comprises a maximum number of hops that the service chain packet is permitted to travel before being discarded, and wherein the processor is further configured to decrement a value in the TTL field before transmitting the service chain packet when the value in the TTL field is greater than 0, and/or the value in the loop prevention field is 0 when the service chain packet is received from a classifier, and/or the value in the loop prevention field is 1 when the service chain packet is received from a second SFF, and/or the value in the loop prevention field is 0 when the service chain packet is received from a service function.

In an embodiment, the disclosure includes a SFF, comprising a receiver configured to receive a service chain packet comprising a loop prevention field, the loop prevention field comprising a plurality of bits indicating whether an error has occurred during packet transmission, and a processor coupled to the receiver and configured to discard the service chain packet when a value in the loop prevention field is greater than or equal to a predefined parameter, the predefined parameter corresponding to a number of bits (n) in the loop prevention field. In some embodiments, a header of the service chain packet comprises the loop prevention field, wherein the header is a Network Service Header (NSH), and/or the predefined parameter is $2^{n-1}$, and wherein n is at least 2, and/or the service chain packet is further encapsulated with an overlay header comprising a Time-To-Live (TTL) field, wherein the TTL field comprises a maximum number of hops that the service chain packet is permitted to travel before being discarded by the SFF, and/or the processor is further configured to discard the service chain packet when a value in the TTL field is equal to 0, and/or the service chain packet is received from a previous SFF.

In an embodiment, the disclosure includes a service node (SN), comprising a receiver configured to receive a service chain packet comprising a loop prevention field from a SFF, the loop prevention field comprising a plurality of bits indicating whether an error has occurred during transmission of the service chain packet, a processor coupled to the receiver and configured to execute a service function on the service chain packet, and set a value in the loop prevention field to 0 after executing the service function on the service chain packet, and a transmitter coupled to the processor and configured to transmit the service chain packet to the SFF.

In an embodiment, the disclosure includes a classifier, comprising a receiver configured to receive a data packet from a source, a processor coupled to the receiver and configured to encapsulate the data packet to comprise a service header and a create service chain packet, the service header comprising a loop prevention field, the loop prevention field comprising a plurality of bits to indicate whether an error has occurred during transmission of the service chain packet, and set a value of the loop prevention field to 0, and a transmitter coupled to the processor and configured to transmit the service chain packet to a SFF after setting the value of the loop prevention field to 0.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

In a network that implements service function chaining, errors that occur during transmission of service chain packets are typically difficult to detect. For example, when service chain packets repeatedly pass through a Service Function Forwarder (SFF) without the SFF invoking a service function (SF), a loop is created in the transmission of the service chain packet. Service chain packets that are transmitting on a loop may not reach the destination endpoint and may unnecessarily consume network resources.

Disclosed herein are embodiments directed to identifying when service chain packets are transmitting in a loop and identifying when an error occurs during transmission of the service chain packets. In an embodiment, service chain packets include a service header with a loop prevention field. A classifier in the network sets an initial value in the loop prevention field to 0 and transmits the service chain packet to an SFF. An SFF is configured to increment the value in the loop prevention field when the value is less than a predefined parameter. The SFF then sends the service chain packet to a service node (SN), which is configured to reset the value in the loop prevention field only after performing a SF on the service chain packet. Each SFF on a service function path (SFP) is configured to compare a value in the loop prevention field with a predefined parameter to determine whether to continue transmission of the service chain packet or discard the service chain packet. Performing such a comparison at each SFF may prevent loops or transmission errors from occurring and unnecessarily clogging network resources within the network.

Figure 1:
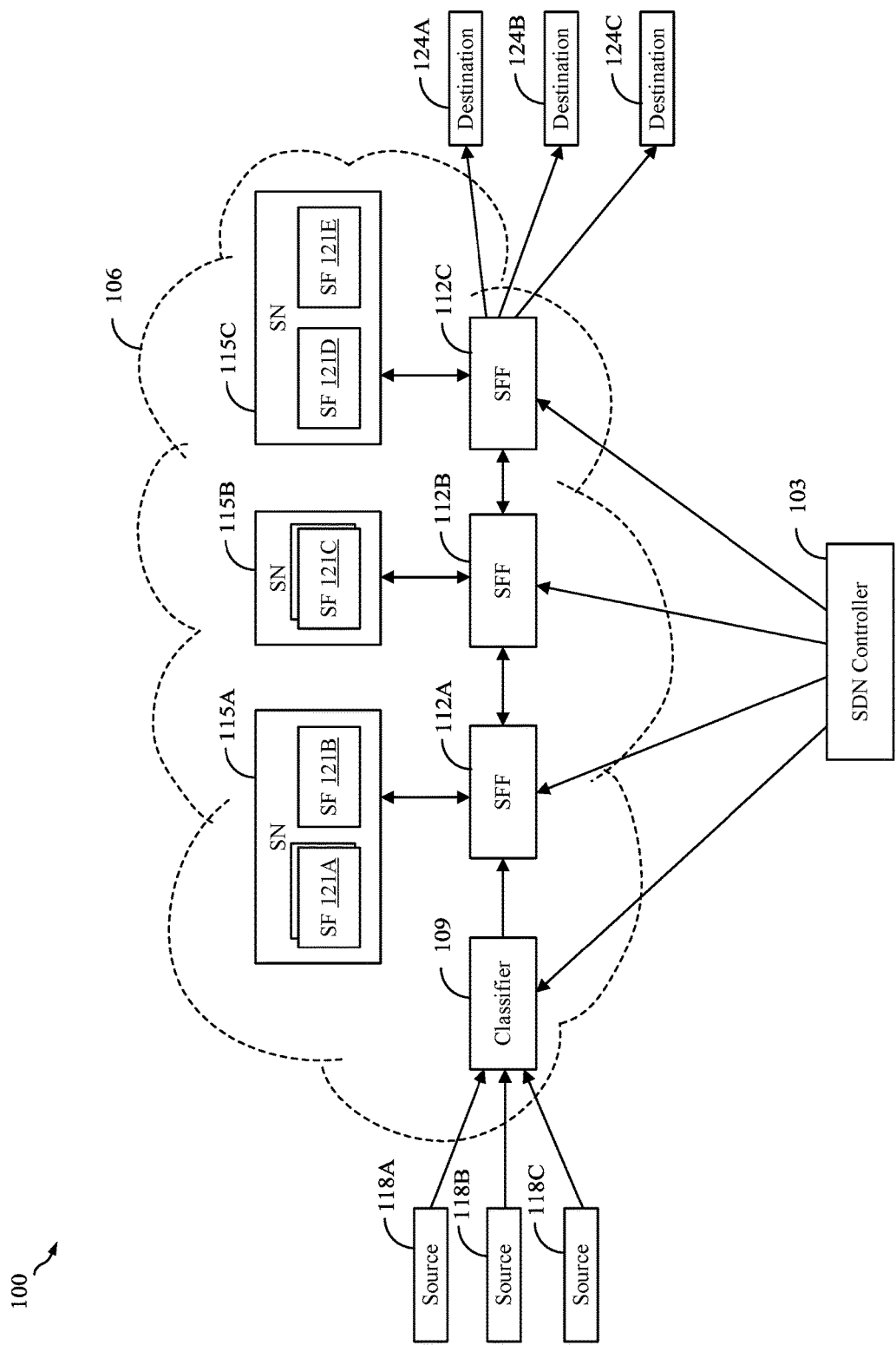
FIG. 1 is a schematic diagram of a network that implements service function chaining according to an embodiment of the disclosure.

FIG. 1 is a schematic diagram of a SFP-enabled network 100 that implements service function chaining according to an embodiment of the disclosure. A SFP-enabled network 100 that implements service function chaining may generate SFPs for applications sending data packets from a source 118 (e.g., source 118A-C) to a destination 124 (e.g., destination 124A-C). A SFP is an abstract sequenced set of SFs 121 (e.g., SFs 121A-E) that a packet, a frame, and/or a traffic flow may traverse for delivering an end-to-end service. SFs 121 refer to any network services, such as, for example, a firewall, an intrusion prevention system (IPS), or a server load-balancer. A SFP may be created according to SF-related information and network topology information. SF-related information may include identifiers that identify SFs 121 in the SFP, locators (e.g., network nodes) that identify instances of the SFs 121 in SFP-enabled network 100, administrative information (e.g., available memory, available capacity, and central processing unit (CPU) utilization), and capability information. Network topology information may include the arrangement of the network nodes and network links in the SFP-enabled network 100. The SFP may include SFFs 112 (e.g., SFFs 112A-C) and SNs 115 (e.g., SNs 115A-C). SNs 115 are network nodes at which the SFs 121 or instances of the SFs 121 are located and SFFs 112 are network nodes that forward data to the SNs 115 so that the SFs 121 may process the data.

The SFP-enabled network 100 may comprise a Software Defined Network (SDN) controller 103 in data communication with a network 106. The underlying physical network of the network 106 may be any type of transport network, such as an electrical network and/or an optical network, and may comprise one or more network domains. The network 106 may employ any transport protocol, such as an Internet Protocol (IP)/User Datagram Protocol (UDP), suitable for transporting data over the underlying physical network of the network 106. The network 106 may employ any type of network virtualization and/or network overlay technologies, such as a virtual extensible local area network (VXLAN). The network 106 may comprise a classifier 109, one or more SFFs 112, and one or more SNs 115. In an embodiment, the network 106 is an SDN-enabled network, where the network control is decoupled from forwarding and the control plane is programmable through software controlled by a central management entity, such as the SDN controller 103. For example, the SDN controller 103 makes routing decisions and communicates the routing decisions to all the network devices, such as the classifier 109, the SFFs 112, the SNs 115, and any other network nodes, in the network 106.

The source 118 and destination 124 in the SFP-enabled network 100 may each be a laptop computer, a tablet computer, a smart phone, a smart television, network site, or a code division multiple access (CDMA) phone configured to request a SFP indicating a sequence of network services or SFs 121 for a data flow. The source 118 and destination 124 may be coupled to the SDN controller 103 via a wired or wireless link.

The SDN controller 103 may be a virtual machine (VM), a dedicated host, a distributed system comprising a plurality of computing devices, or any other device and/or system configured to manage the network 106. The SDN controller 103 performs SDN management and/or control operations, such as determining forwarding paths in the network 106 and configuring network nodes, such as the classifier 109, the SFFs 112, and the SNs 115, with the forwarding instructions. In addition, the SDN controller 103 may interact with other SFP entities to facilitate the implementations of SFPs. For example, the SDN controller 103 may create an SFP to serve an application by determining a series of SFs 121, such as firewall or policy routing, to form a composite service for implementing the application.

The classifier 109 may be a VM, dedicated host, a network node, such as a router and/or a switch, or any other device configured to perform classification. For example, a classifier 109 may be a component within an SFP ingress node, which is an SFP boundary node that handles traffic entering an SFP-enabled domain or an SFP proxy node in the SFP enabled-domain. In an embodiment, when the classifier 109 receives a data packet from a source 118 (e.g., source 118A-C), the classifier 109 identifies an SFP and a service flow or a SFP for the data packet. To direct the data packet along the identified SFP, the classifier 109 generates a service chain packet to carry both the data packet and the SFP information, for example, by encapsulating the data packet with a service header indicating the SFP information. One example of a service header may be a network service header (NSH), as described in the Internet Engineering Task Force (IETF) draft document entitled "Network Service Header (NSH)," dated Oct. 20, 2017 ("IETF Draft Document for NSH"), which is hereby incorporated by reference in its entirety. An example of the service header according to embodiments of the present disclosure will be further described in FIG. 6. The classifier 109 sends the service chain packet to a next SFF 112A in the identified service flow. It should be noted that the classifier 109 may perform additional encapsulations over the Service chain packet, for example, according to a transport protocol and/or a network overlay (e.g., IP/UDP, VXLAN) in use.

The SFFs 112 are any network nodes or devices, such as router, switches, and/or bridges, configured to forward packets and/or frames received from the network 106 to one or more SNs 115 associated with the SFFs 112 according to information carried in the service header. When an SFF 112 receives a packet carrying a service header from the network 106, the SFF 112 performs decapsulation (e.g., removal of transport header) to obtain the service chain packet. In an embodiment, the SFF 112 obtains a value in a loop prevention field of the service chain packet to determine whether a forwarding error has occurred during transmission of the service chain packet, as will be discussed more fully below. If a forwarding error has not occurred during transmission of the service chain packet, the SFF 112 determines the appropriate SFs 121 for processing the packet. The SFF 112 determines the SNs 115 that provide the SFs 121 or instances of the SFs 121, for example, according to SF-to-locator mappings received from the SDN controller 103. The SFF 112 forwards the service chain packet to the SNs 115 in an order (e.g., SF 121A-E). In an embodiment, when the SNs 115 return the SF-processed data in the service chain packet, the SFF 112 is configured to increment the value in the loop prevention field, as will be discussed more fully below. The SFF 112 may then forward the SF-processed data to another SN 115 or to a next SFF 112. When the SFF 112 is a last SFF (e.g., SFF 112C) in the SFP, the SFF 112 may deliver the data processed by a last SF (e.g., SF 121E) to a destination 124 (e.g., destination 124A-C).

The SNs 115 may be VMs, hypervisors, or any other devices configured to process packets and/or frames according to SF 121 types. In one embodiment, an SN 115 may implement one or more SFs 121 which are logical entities or software components. In another embodiment, multiple occurrences of an SF 121 may be located in several SNs 115 in the same SFP-enabled domain. In some embodiments, an SN 115 may be the same node as the classifier 109, where the SN 115 implements one or more SFs 121 and classification. Some example SFs 121 provided by the SNs 115 may include firewalls, WAN and application acceleration, server load balancing, lawful intercept, NAT, such as NAT-type 44 (NAT44) for Internet Protocol version 4 (IPv4) address translation or NAT-type 64 (NAT64) for IP version 6 (IPv6) address translation, network prefix translation (NPT), hypertext transfer protocol (HTTP) header enrichment function, and/or transport control protocol (TCP) optimizer. When an SN 115 receives a service chain packet from the SFF 112, the SF 121 located at the SN 115 processes the data packet carried in the received service chain packet. In some embodiments, the SN 115 is configured to set the value in the loop prevention field of the service chain packet to 0 after processing the data packet, as will be discussed more fully below.

Figure 2:
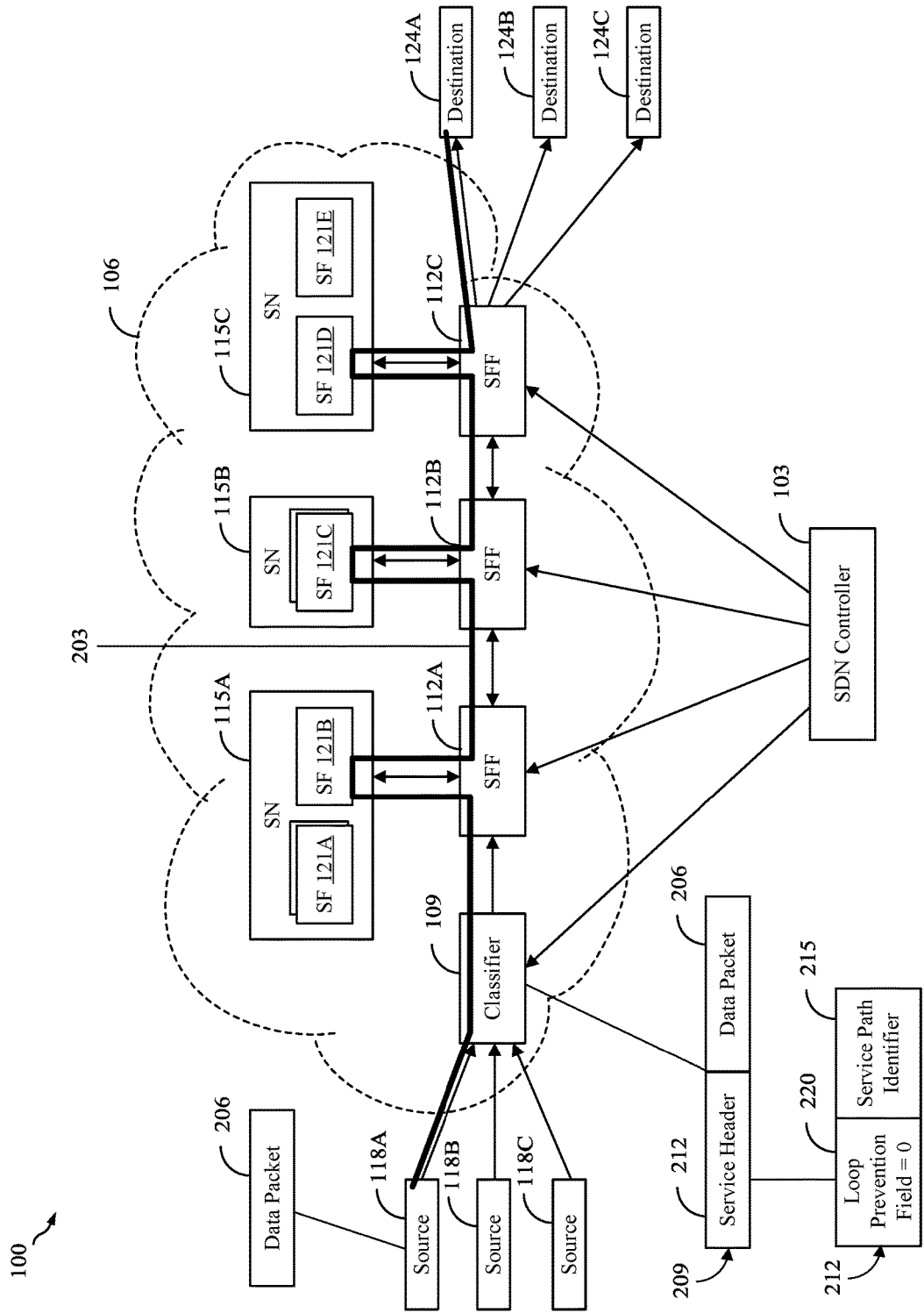
FIG. 2 is a schematic diagram of a network implementing a loop prevention mechanism while transmitting packets along a SFP according to an embodiment of the disclosure.

FIG. 2 is a schematic diagram of SFP-enabled network 100 implementing a loop prevention mechanism while transmitting packets along a SFP 203 according to an embodiment of the disclosure. FIG. 2 shows an example of a method of loop prevention while successfully transmitting a packet from a source 118A to a destination 124A. For example, source 118A sends a request to the SDN controller 103 indicating a sequence of network services or SFs 121 for a data flow. The SDN controller 103 may compute a shortest path through network 106 traversing a subset of the available SFs 121 to determine the SFP 203 based on the request. For the example shown in FIG. 2, the subset of available SFs 121 included in SFP 203 include SF 121B, SF 121C, and SF 121D. The SFFs 112 corresponding to the available SFs 121B, SF 121C, and SF 121D include SFF 112A, SFF 112B, and SFF 112C, respectively. The SDN controller 103 may assign SF 121B, SF 121C, and SF 121D according to the request to create SFP 203.

The SDN controller 103 may transmit the SFs 121 and SFFs 112 that are included in SFP 203 to classifier 109 such that the classifier 109 is configured to encapsulate a service header 212 onto data packets 206 received from an application executed at source 118 to be transmitted to destination 124 via network 106. For example, an application executed at source 118A generates a data packet 206 comprising a payload. Source 118A may transmit the data packet 206 to the classifier 109. The classifier 109 may determine the SFP 203 and a service flow or SFP for the data packet 206 based on information received from the SDN controller 103. In an embodiment, the classifier 109 may encapsulate the data packet 206 with a service header 212 to create a service chain packet 209. The service chain packet 209 may comprise a service header 212, as the NSH. The service header 212 may carry SFP traffic steering information (e.g., service path information) and SFP metadata information. For example, the service header 212 may carry a service path identifier 215, which may be defined by the classifier 109 or the SDN controller 103 to uniquely identify SFP 203.

According to some embodiments, the service header 212 may further include a loop prevention field 220. The loop prevention field 220 may be configured to indicate whether an error has occurred during transmission of the data packet 206 across network 106. For example, the loop prevention field 220 may be created by using a number (n) of reserved bits that are available in a service header 212. In an embodiment, the classifier 109 sets a value in the loop prevention field 220 to 0 after encapsulating the service header 212 onto the data packet 206. For example, the value in the loop prevention field 220 may be set to 00 when the loop prevention field 220 includes 2 bits.

After the classifier 109 encapsulates the data packet 206 to create the service chain packet 209, the classifier 109 may transmit the service chain packet 209 to the SFF 112A according to the service path identifier 215. In an embodiment, the SFF 112A is configured to first obtain the value in the loop prevention field 220 and compare the value in the loop prevention field 220 to a predefined parameter. In an embodiment, the SFF 112A is configured to determine to continue transmission of the service chain packet 209 when the value in the loop prevention field 220 is less than the predefined parameter. In an embodiment, the SFF 112A is configured to discard the service chain packet 209, or discontinue transmission of the service chain packet 209, when the value in the loop prevention field 220 is greater than or equal to the predefined parameter.

In some embodiments, the loop prevention field 220 comprises at least 2 bits. In some embodiments, the predefined parameter is based on the number of bits (n) in the loop prevention field 220 such that the predefined parameter is in the range from $2^{n-1}$ to $2^n-1$. For example, when the loop prevention field 220 has 2 bits, the predefined parameter is equal to 2 or 3 depending on the embodiment. In this case, each of the SFFs 112 along an SFP 203 is configured to compare the value in the loop prevention field 220 to the predefined parameter such as 2. The predefined parameter according to embodiments of the disclosure will be more fully described below.

Continuing the example, SFF 112A obtains the service chain packet 209 from the classifier 109 with the value of the loop prevention field 220 being 0. SFF 112A may determine that the value of the loop prevention field 220, which is 0, is less than the predefined parameter, such as 2. In this case, SFF 112A continues to transmit the service chain packet 209 to SN 115A, which runs the SF 121B on the service chain packet 209. For example, the SF 121B is performed on the data packet 206 within the service chain packet 209. When SN 115A successfully performs SF 121B on the data packet 206, SN 115A may be configured to reset the value in the loop prevention field 220 to 0. When SN 115A is unable to successfully perform SF 121B on the data packet 206 or SF 121B is unavailable at SN 115A, the SN 115A does not change the value in the loop prevention field 220.

As shown in FIG. 2, SN 115A is configured to transmit the service chain packet 209 back to SFF 112A, where the value in the loop prevention field 220 is 0 because SN 115A successfully performed SF 121B on data packet 206. Similar to when SFF 112A received the service chain packet 209 from the classifier 109, SFF 112A may again increment the value in the loop prevention field 220 to 1. After incrementing, SFF 112A forwards the service chain packet 209 to SFF 112B based on the service path identifier 215 in the service header 212.

SFF 112B receives the service chain packet 209 and determines whether the value in the loop prevention field 220 received from SFF 112A is less than the predefined parameter. For example, SFF 112B determines that the value in the loop prevention field 220, which is 1, is less than the predefined parameter, such as 2. In this case, SFF 112B again increments the value in the loop prevention field 220 to 2 and then continues to transmit the service chain packet 209 to SN 115B. SN 115B may be configured to execute SF 121C on the service chain packet 209. After SN 115B successfully performs SF 121C on the service chain packet 209, SN 115B may be configured to reset the value in the loop prevention field 220 to 0 and then transmit the service chain packet 209 back to SFF 112B. Upon receiving the service chain packet 209 where the value in the loop prevention field 220 is 0, SFF 112B may again increment the value in the loop prevention field 220. For example, SFF 112B increments the value in the loop prevention field 220 to 1 and forwards the service chain packet 209 to SFF 112C based on the service path identifier 215 in the service header 212.

SFF 112C receives the service chain packet 209 and determines whether the value in the loop prevention field 220 is less than the predefined parameter. For example, SFF 112C determines that the value in the loop prevention field 220, which is 1, is still less than the predefined parameter, such as 2. In this case, SFF 112C may increment the value in the loop prevention field 220 to 2 and then transmit the service chain packet 209 to SN 115C. SN 115C may be configured to execute SF 121D on the service chain packet 209. After SN 115C successfully performs SF 121D on the data packet 206, SN 115C may be configured to reset the value in the loop prevention field 220 to 0 and then transmit the service chain packet 209 back to SFF 112C. Upon receiving the service chain packet 209 where the value in the loop prevention field 220 is 0, SFF 112C may again increment the value in the loop prevention field 220. In an embodiment in which SFF 112C determines that SFF 112C is the last SFF 112 before the data packet 206 is sent to the destination 124A, SFF 112C may decapsulate the service chain packet 209 and send the data packet 206 to destination 124A.

As shown in FIG. 2, the value in the loop prevention field 220 is incremented each time the service chain packet 209 reaches a SFF 112 and resets to 0 each time the service chain packet 209 leaves an SN 115 after successfully performing a service on the service chain packet 209. Each time a SFF 112 receives the service chain packet 209, the SFF 112 determines whether the value in the loop prevention field 220 is less than a predetermined parameter. When the value in the loop prevention field 220 is less than a predetermined parameter, SFF 112 determines that an error has not occurred during transmission of the service chain packet 209, as shown in FIG. 2.

Figure 3:
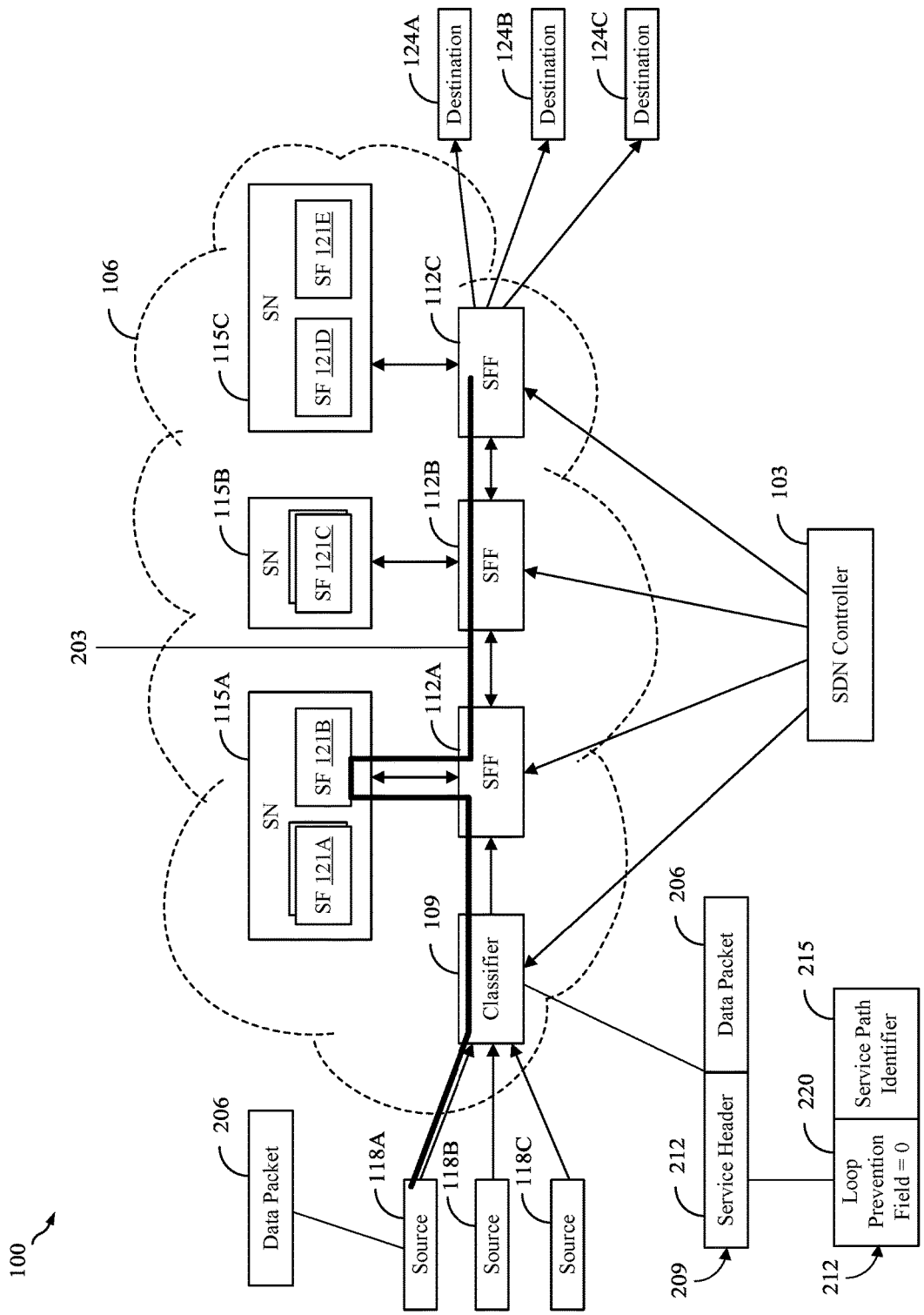
FIG. 3 is a schematic diagram of a network implementing a loop prevention mechanism while transmitting packets along a service function path (SFP) according to an embodiment of the disclosure.

FIG. 3 is a schematic diagram of SFP-enabled network 100 implementing a loop prevention mechanism while transmitting packets along a SFP 203 according to an embodiment of the disclosure. FIG. 3 shows an example of a method 300 of loop prevention when a failure occurs during transmission of a packet from a source 118A to a destination 124A. Source 118A, destination 124A, SDN controller 103, classifier 109, SFFs 112A-C, SNs 115A-C, and SFs 121A-E in method 300 operate similar to how they did in method 200, except that SFF 112C determines that an error occurs during transmission of service chain packet 209 and discards the service chain packet 209.

Similar to method 200, in method 300 the classifier 109 encapsulates the data packet 206 to include a service header 212, creating the service chain packet 209. The classifier 109 is configured to set the value in the loop prevention field 220 of the service header 212 to 0. The classifier 109 transmits the service chain packet 209 to SFF 112A. SFF 112A first obtains the value in the loop prevention field 220 and compares the value with the predefined parameter, such as, in this example, 2. Since the value in the loop prevention field 220 is 0 after being received from the classifier 109, the value in the loop prevention field 220 is less than the predefined parameter. SFF 112A transmits the service chain packet 209 to SN 115A, which performs SF 121B on the data packet 206. SN 115A resets the value in the loop prevention field 220 to 0 after successfully performing SF 121B on the service chain packet 209 and then forwards the service chain packet 209 back to SFF 112A. SFF 112A again increments the value in the loop prevention field 220 to 1 and then forwards the service chain packet 209 to SFF 112B.

As shown in FIG. 3, SFF 112B receives the service chain packet 209 from SFF 112A but does not transmit the service chain packet 209 to SN 115B to invoke SF 121C. There may be many reasons why SFF 112B receives the service chain packet 209 but does not invoke a SF 121. For example, SFF 112B may not actually be connected to a SN 115 that has a SF 121 which is to be performed on a data packet 206. In this case, SFF 112B has received the service chain packet 209 by mistake, and has thus created an error in transmitting the packet from the source 118A to the destination 124A. In another case, SF 121C may be experiencing a failure such that SF 121C cannot transmit the service chain packet 209 to SN 115B to execute SF 121C. In this case, SN 115B merely receives the service chain packet 209 without performing a SF 121 on the packet and then forwards the service chain packet 209 to another SFF 112C, thereby causing a loop to occur within network 106. An error occurs among SFFs 112 when one SFF 112 receives a service chain packet 209 and forwards the service chain packet 209 to another SFF 112 without performing a SF 121 on the service chain packet 209. Such errors may result in loops occurring while transmitting the data packet 206 from the source 118 to the destination 124.

When SFF 112B receives the service chain packet 209, the SFF 112B first determines whether the value in the loop prevention field 220 is less than the predefined parameter. Since the value in the loop prevention field 220 is 1, which is still less than 2, the SFF 112B determines that the service chain packet 209 may continue to be transmitted. The SFF 112B is configured to increment the value in the loop prevention field 220 to 2 even though the SFF 112B does not transmit the service chain packet 209 to SN 115. After incrementing the value in the loop prevention field 220, SFF 112B transmits the service chain packet 209 to SFF 112C.

Upon receiving the service chain packet 209, SFF 112C determines whether the value in the loop prevention field 220 is less than the predefined parameter. The SFF 112B incremented the value in the loop prevention field 220 to 2, such that when SFF 112C receives the service chain packet 209, the value in the loop prevention field 220 is no longer less than the predefined parameter, which is also 2. The SFF 112C may be configured to discard the service chain packet 209 when the value in the loop prevention field 220 is greater than or equal to the predefined parameter. For example, SFF 112C may discontinue transmission of the service chain packet 209 when the value in the loop prevention field 220 is greater than or equal to the predefined parameter.

Similar to method 200, the value in the loop prevention field 220 is incremented each time the service chain packet 209 reaches a SFF 112 and reset to 0 each time the service chain packet 209 leaves an SN 115 after successfully performing a service on the service chain packet 209. When an SFF 112 forwards a service chain packet 209 without invoking a SF 121, SFF 112 still increments the value in the loop prevention field 220. Each time a SFF 112 receives the service chain packet 209, the SFF 112 determines whether the value in the loop prevention field 220 is less than a predetermined parameter. When the value in the loop prevention field 220 is greater or equal to the predetermined parameter, SFF 112 determines that an error has occurred during transmission of the service chain packet 209, as shown in FIG. 3. In such a case, the SFF 112 discards the service chain packet 209.

Figure 4:
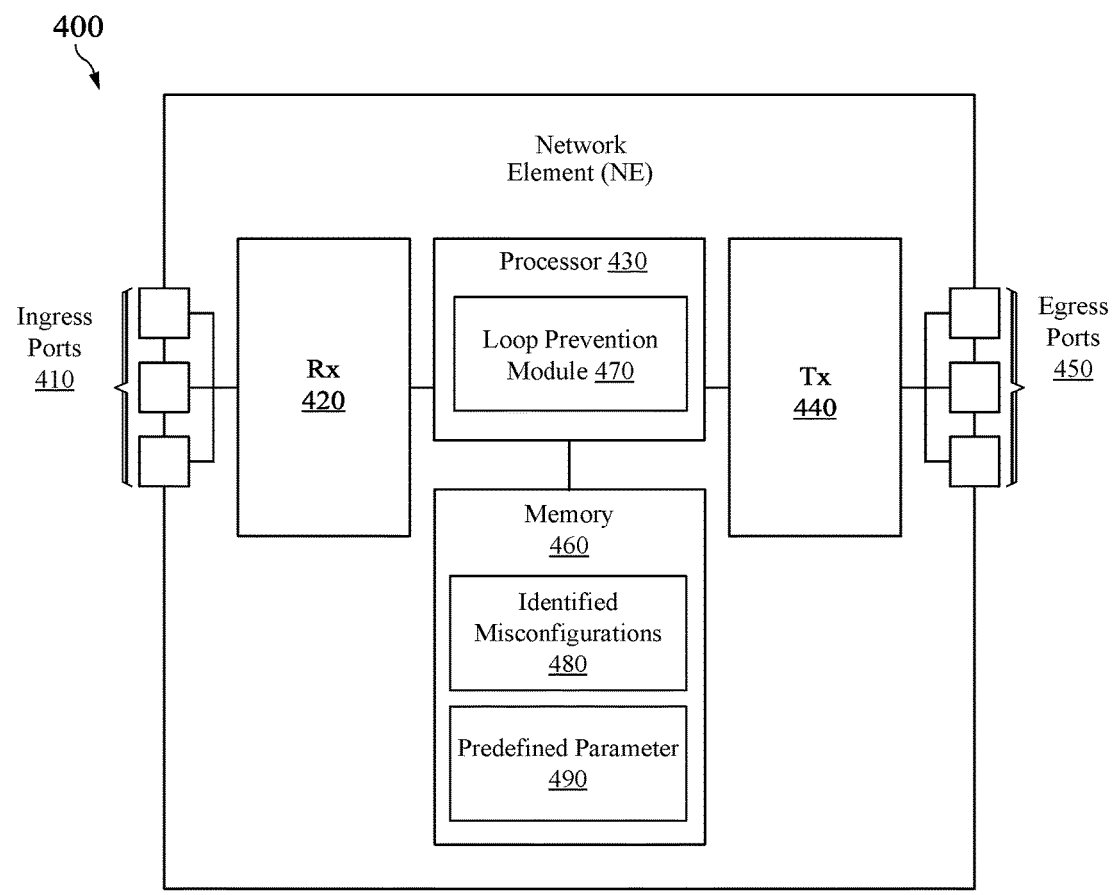
FIG. 4 is a schematic diagram of an embodiment of a network element (NE) in a network implementing service function chaining.

FIG. 4 is a schematic diagram of an embodiment of a network element (NE) 400 in a SFP-enabled network 100. For instance, the NE 400 may be a classifier 109, SFF 112, SN 115, source 118, destination 124, or SDN controller 103. The NE 400 may be configured to implement and/or support the loop prevention mechanisms described herein. The NE 400 may be implemented in a single node or the functionality of NE 400 may be implemented in a plurality of nodes. One skilled in the art will recognize that the term NE encompasses a broad range of devices of which NE 400 is merely an example. The NE 400 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 400. For instance, the features and/or methods in the disclosure may be implemented using hardware, firmware, and/or software installed to run on hardware. As shown in FIG. 4, the NE 400 comprises one or more ingress ports 410 and a receiver unit (Rx) 420 for receiving data, at least one processor, logic unit, or CPU 430 to process the data, a transmitter unit (Tx) 440 and one or more egress ports 450 for transmitting the data, and a memory 460 for storing the data.

The processor 430 may comprise one or more multi-core processors and be coupled to a memory 460, which may function as data stores, buffers, etc. The processor 430 may be implemented as a general processor or may be part of one or more application specific integrated circuits (ASICs) and/or digital signal processors (DSPs). The processor 430 may comprises a loop prevention module 470, which may perform processing functions of classifier 109, SFF 112, SN 115, source 118, destination 124, or SDN controller 103 and implement methods 200, 300, 500, 800, 900, and 1000, as discussed more fully below, and/or any other method discussed herein. As such, the inclusion of the loop prevention module 470 and associated methods and systems provide improvements to the functionality of the NE 400. Further, the loop prevention module 470 effects a transformation of a particular article (e.g., the network) to a different state. In an alternative embodiment, the loop prevention module 470 may be implemented as instructions stored in the memory 460, which may be executed by the processor 430.

The memory 460 may comprise a cache for temporarily storing content, e.g., a random-access memory (RAM). Additionally, the memory 460 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 460 may be configured to store identified misconfigurations 480, which may include, for example, the service path identifiers 215 of SFPs that have been identified as resulting in an error during transmission of packets. The memory 460 may also be configured to store the predefined parameter 490, which is limited by the number of bits (n) in the loop prevention field 220.

It is understood that by programming and/or loading executable instructions onto the NE 400, at least one of the processor 430 and/or memory 460 are changed, transforming the NE 400 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 5:
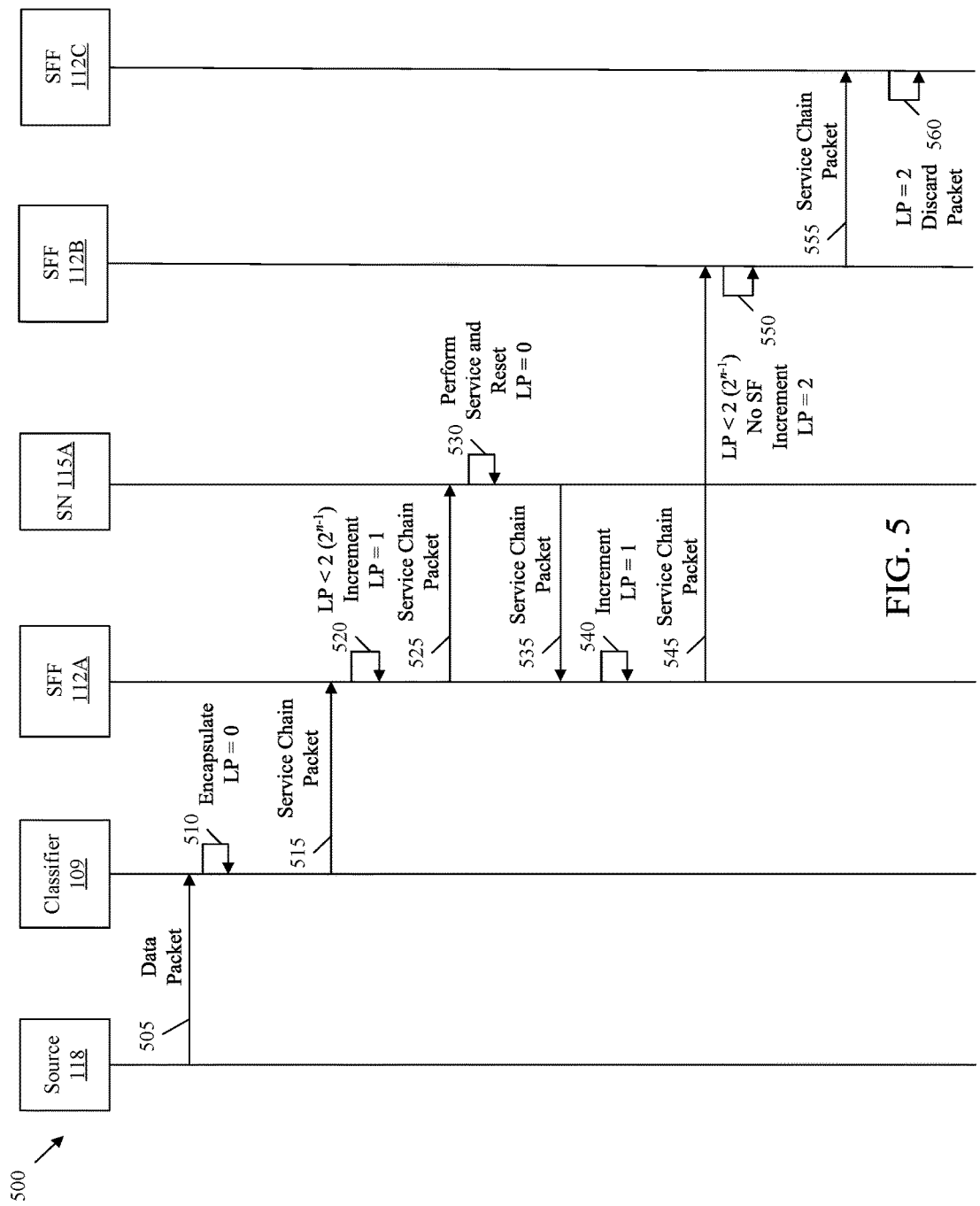
FIG. 5 is a protocol diagram of an embodiment for performing loop prevention in a network implementing service function chaining.

FIG. 5 is a protocol diagram of a method 500 for performing loop prevention in a network implementing service function chaining, such as SFP-enabled network 100. The method 500 is implemented by a source 118, classifier 109, SFF 112A, SN 115A, SFF 112B, and SFF 112C. The method 500 is initiated when a source 118 transmits a request to a SDN controller 103 for the SDN controller 103 to determine a SFP 203 for data packets 206 transmitted from the source 118 to a destination 124. At step 505, the source 118 transmits a data packet 206 to a classifier 109. For example, the Tx 440 of the source 118 transmits the data packet 206 to the classifier 109. A Rx 420 of the classifier 109 may receive the data packet 206.

At step 510, the classifier 109 may identify a SFP 203 for the data packet 206 based on information received from the SDN controller 103. In some embodiments, the classifier 109 may encapsulate the data packet 206 to include a service header 212, thereby creating the service chain packet 209. In some embodiments, the service header 212 includes a loop prevention field 220 that indicates whether an error has occurred during transmission of the data packet 206. In an embodiment, the loop prevention field 220 comprises at least 2 bits. The classifier 109 may be configured to set the value in the loop prevention field 220 to 0.

At step 515, the classifier 109 may transmit the service chain packet 209 to SFF 112A based on the SFP 203 for the data packet 206. For example, the Tx 440 of the classifier 109 transmits the service chain packet 209 with the value in the loop prevention field 220 being set to 0. The Rx 420 of the SFF 112A may receive the service chain packet 209 from the classifier 109. At step 520, the SFF 112A determines whether the value in the loop prevention field 220 is less than the predefined parameter 490. For example, the loop prevention module 470 executed by the processor 430 is configured to determine whether the value in the loop prevention field 220 is less than the predefined parameter 490. As shown in FIG. 5, the predefined parameter 490, which is limited by the number of bits (n) in the loop prevention field 220, may be equal to $2^n-1$. The loop prevention field 220 used in the example shown in FIGS. 1-3 includes 2 bits, and the predefined parameter 490 in the example above is equal to 2. Since the value in the loop prevention field 220 is 0 when the SFF 112A receives the service chain packet 209 from the classifier 109, the SFF 112A may determine that an error has not occurred during transmission of the service chain packet 209 and continue transmission. At step 520, the SFF 112A also increments the value in the loop prevention field 220 to 1 when the value in the loop prevention field 220 is less than the predefined parameter 490. For example, the loop prevention module 470 executed by the processor 430 is configured to increment the value in the loop prevention field 220 when the value in the loop prevention field 220 is less than the predefined parameter 490.

At step 525, the SFF 112A transmits the service chain packet 209 to the SN 115A to invoke an SF 121 at the SN 115A. For example, the Tx 440 of the SFF 112A transmits the service chain packet 209 to the SN 115A. At step 530, SN 115A invokes SF 121 to perform a network function on the data packet 206 within the service chain packet 209. For example, the processor 430 of the SN 115A invokes SF 121 to perform the network function on the data packet 206. At step 530, the SF 121 successfully performs the network function on the data packet 206 and then resets the value in the loop prevention field 220 to 0. For example, the processor 430 of the SN 115A resets the value in the loop prevention field 220 to 0. In the case where the network function cannot be performed on the data packet 206 by SF 121 at SN 115A, the value in the loop prevention field 220 may remain the same and is not reset.

At step 535, the SN 115A transmits the service chain packet 209 back to SFF 112A. For example, the Tx 440 of the SN 115A transmits the service chain packet 209 back to SFF 112. When the SN 115A successfully performed SF 121 on the service chain packet 209, the value in the loop prevention field 220 is 0, and at step 540, the SFF 112A increments the value in the loop prevention field 220 to 1. In the case where the SN 115A is unable to perform SF 121 on the service chain packet 209, the SFF 112A may still increment the value in the loop prevention field 220. For example, the loop prevention module 470 executed by the processor 430 is configured to increment the value in the loop prevention field 220.

At step 545, the SFF 112A transmits the service chain packet 209 to SFF 112B where the loop prevention field 220 includes the value of 1. For example, the Tx 440 transmits the service chain packet 209 to SFF 112B. At step 550, the SFF 112 determines whether the value in the loop prevention field 220 is less than the predefined parameter 490. For example, the loop prevention module 470 executed by the processor 430 is configured to determine whether the value in the loop prevention field 220 is less than the predefined parameter 490. The predefined parameter 490 in the example shown in FIG. 3 is 2. Since the value in the loop prevention field 220 is 1 when the service chain packet 209 is received from SFF 112A, the SFF 112B may determine that an error has not occurred during transmission of the service chain packet 209 and continue transmission. At step 520, the SFF 112B does not perform a SF 121 on the data packet 206 of the service chain packet 209 for one of the various reasons discussed above with reference to FIG. 3. However, even though a SF 121 is performed on the service chain packet 209, the SFF 112B is still configured to increment the value in the loop prevention field 220 to 2. For example, the processor 430 increments the value in the loop prevention field 220.

At step 555, the SFF 112B transmits the service chain packet 209 to SFF 112C. For example, Tx 440 of SFF 112B transmits the service chain packet 209 to SFF 112C. A Rx 420 of SFF 112C receives the service chain packet 209 where the value in the loop prevention field 220 is 2. At step 560, SFF 112C determines whether the value in the loop prevention field 220 is less than the predefined parameter 490. For example, the loop prevention module 470 executed by the processor 430 is configured to determine whether the value in the loop prevention field 220 is less than the predefined parameter 490. Here, the value in the loop prevention field 220 is 2 when the service chain packet 209 is received from SFF 112B. SFF 112C may determine that the value in the loop prevention field 220 is greater than or equal to the predefined parameter 490 and discard, or discontinue transmission of, the service chain packet 209.

Figure 6:
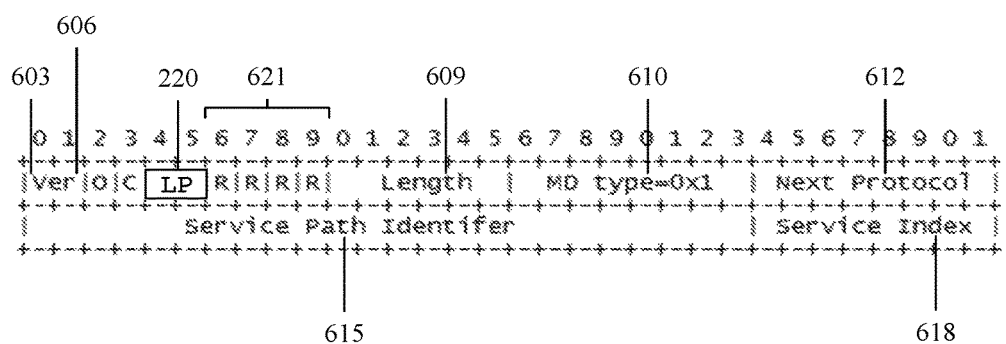
FIG. 6 is a diagram of a service header according to an embodiment of the disclosure.

FIG. 6 is a diagram of a service header 212 according to an embodiment of the disclosure. For example, the service header 212 is a NSH as described in the IETF Draft Document for NSH, which is already incorporated by reference above in the description for FIG. 1. The service header 212 includes service path information and optionally metadata that are added to a data packet 206 and used to create a service plane. Subsequently, an outer transport encapsulation is imposed on the service header 212, which is used for network forwarding. The classifier 109 adds the service header 212 onto the data packet 206, and the last SFF 112C in the SFP 203 removes the service header 212.

As shown in FIG. 6, the service header 212 comprises a version field 603, an operations, administration, and maintenance (OAM) field 606, a loop prevention field 220, a length field 609, a metadata (MD) type field 610, a next protocol field 612, a service path identifier field 615, a service index field 618, and reserved bits 621. As should be appreciated, the service header 212 may not include all of these fields and/or may include additional fields. The version field 603 indicates a version and is used to ensure backward compatibility going forward with future service header 212 specification updates. The OAM field 606 indicates whether the data packet 206 is an OAM packet.

The MD type field 610 indicates a format of the metadata being carried in the service chain packet 209. The next protocol field 612 indicates the protocol type of the encapsulated data. The service path identifier field 615 includes a service path identifier that uniquely identifies a SFP 203. SFFs 112 and SNs 115 use this service path identifier to select the SF 121 to perform on the service chain packet 209. The service index field 618 includes the service index that provides a location within the SFP 203. The service index is used in conjunction with the service path identifier for SFP selection for determining the next SFF 112, SN 115, and/or SF 121 in the path. The reserved bits 621 may be extra bits that do currently not carry information.

As shown in FIG. 6, the loop prevention field 220 occupies two or more reserved bits that are available in the service header 212. Although only 2 bits are shown in the loop prevention field 220 of FIG. 6, there may be any number of bits used for the loop prevention field 220. In some embodiments, the number of bits (n) used for the loop prevention field 220 corresponds to the predefined parameter 490. If n bits are used in a loop prevention field 220, then $2^n-1$ is a maximum number of consecutive SFFs 112 permitted for an SFP 203. In an embodiment, the predefined parameter 490 is $2^{n-1}$ such that the value in the loop prevention field 220 is compared to $2^{n-1}$. For the examples shown in FIGS. 2-3 and 5, the predefined parameter 490 is 2 because n=2. In some embodiments, SFP resilience to SF 121 failures is considered by using more than 2 bits in the loop prevention field 220. For example, when a SF 121 fails, service chain packets 209 may pass through more than two SFFs 112, or middle relay components, without reaching an SF 121. To allow for the service chain packets 209 to pass through more than two SFFs 112 to find a working SF 121, the loop prevention field 220 may include more than 2 bits. In this embodiment, each of the SFFs 112 are configured to determine the number of bits (n) in the loop prevention field 220 when a service chain packet 209 is received. The SFFs 112 may then be configured with the predefined parameter 490 based on the number of bits (n) in the range $2^{n-1}$ to $2^n-1$. Each of the SFFs 112 are configured to increment the value in the loop prevention field 220 based on whether the value currently in the loop prevention field 220 is less than the computed predefined parameter 490.

Figure 7:
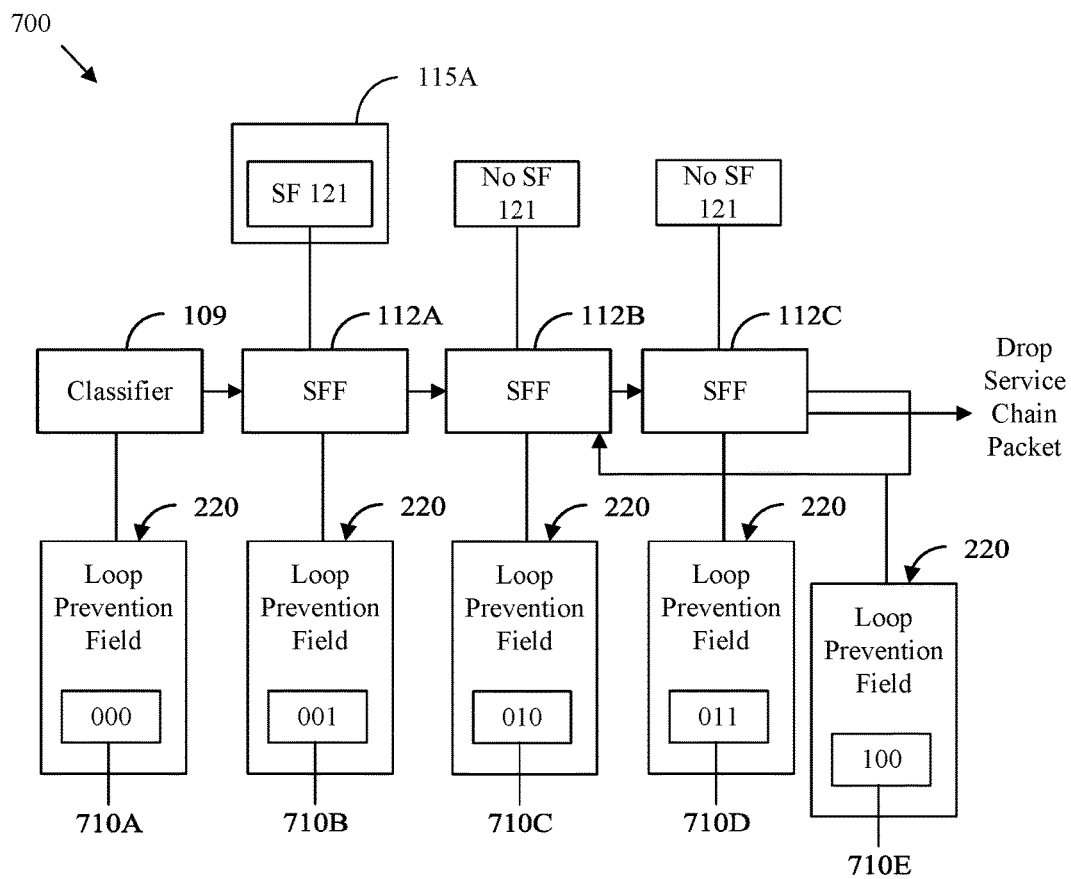
FIG. 7 illustrates an example of values in the loop prevention field when the loop prevention field includes 3 bits.

FIG. 7 illustrates a method 700 of loop prevention according to an embodiment of the disclosure. FIG. 7 shows examples of values 710 (e.g., values 710 A-E) in the loop prevention field 220 when the loop prevention field 220 includes 3 bits. When the loop prevention field 220 includes 3 bits, the predefined parameter 490 may be 4 ($2^{3-1}$). In such a case, each SFF 112A-C determines whether the value 710 in the loop prevention field 220 is less than 4. As shown in FIG. 7, the value 710 may be a binary value.

As shown in FIG. 7, when the classifier 109 encapsulates the data packet 206 to include the service header 212 and creates the service chain packet 209, the classifier 109 sets the value 710A in the loop prevention field 220 to 0 (shown as the binary value 000 in FIG. 7) and transmits the service chain packet 209 to SFF 112A. SFF 112A first determines that the value 710A (0) is less than 4, increments the value 710A to be 1 (shown as the binary value 001 in FIG. 7), then transmits the service chain packet 209 to SN 115A to perform a SF 121 on the service chain packet 209. SN 115 resets the value 710 back to 0, and sends the service chain packet 209 back to SFF 112A. SFF 112A again increments the value 710B to 1 (shown as the binary value 001 in FIG. 7) and transmits the service chain packet 209 to SFF 112B.

SFF 112B also determines that the value 710B (1) is less than 4, but SFF 112B does not transmit the service chain packet 209 to a SN 115 to invoke an SF 121. Instead, SFF 112B increments the value 710C to 2 (shown as the binary value 010 in FIG. 7) and transmits the service chain packet 209 to SFF 112C. SFF 112C also determines that the value 710C (2) is less than 4 and does not transmit the service chain packet 209 a SN 115 to invoke an SF 121. SFF 112C instead increments the value 710D to 3 (shown as the binary value 0011 in FIG. 7) and transmits the service chain packet 209 back to SFF 112B. SFF 112B determines that the value 710 (3) is less than 4 and again does not transmit the service chain packet 209 to a SN 115. SFF 112B increments the value 710E to 4 (shown as the binary value 100 in FIG. 7) and transmits the service chain packet 209 to SFF 112C.

In traditional SFP-enabled networks, the loop occurring between SFF 112B and SFF 112C during the transmission of the service chain packet 209 may not be detected because a loop prevention field 220 is typically not included in a service header 212. Embodiments of the disclosure herein prevent the loop between SFF 112B and SFF 112C from continuously occurring because SFF 112C is configured to discard the service chain packet 209 after determining that the value 710E (4) is greater than or equal to the predefined parameter 490 of 4. As shown in FIG. 7, the 3 bit loop prevention field 220 permits the service chain packet 209 to account for some SF 121 failures while still maintaining the ability to discard packets once an error in packet transmission is detected.

In an embodiment, the service chain packet 209 may be additionally encapsulated with an overlay header to be transmitted across overlay nodes in an overlay network. In an embodiment, the overlay header may include a Time-to-Live (TTL) field that may be more than 2 bits. For example, a TTL field may be 8 bits in length. The TTL field may be set by an ingress node on an overlay path to include a value indicating a maximum number of hops for an overlap path that may be used for loop detection. The initial value in the TTL field may be configurable or specific to one or more overlay paths. If no initial value in the TTL field is provided, a default initial TTL value may be used. Each overlay node on an overlay path may be configured to decrement a value in the TTL field by 1 prior to forwarding the overlay packet to another overlay node. When an overlay node receives an overlay packet, the overlay node may first determine whether the value in the TTL field is 0. The overlay node may be configured to discard the overlay packet when the value in the TTL field is 0. The overlay node may be configured to continue transmission of the overlay packet along the overlay path when the value in the TTL field is greater than 0.

In an embodiment, the TTL field may be included in the overlay header when an inner header with a TTL value is not used in the service chain packet 209. In an embodiment, the TTL field may be included in the overlay header when an inner header with a TTL value does not exist in the service chain packet 209. In an embodiment, the TTL field may be included in the overlay header when an inner header with a TTL field includes a large value, for example, to cover delivery after a final overlay hop. In this embodiment, the maximum number of hops for an overlay path may be smaller than the large value.

In an embodiment, a service header 212 used for service function chaining may include a TTL field, for example, in some of the reserved bits 621 of the service header 212. For example, the TTL field in the service header 212 may include a value for a maximum number of SFF 112 hops for an SFP. The TTL field here may also be used for service plane loop detection similar to the loop prevention field 220. The initial TTL value in the TTL field may be set by the classifier 109 or the SDN controller 103. The initial TTL value may be configurable or set specifically for one of the SFPs 203. If an initial value for the TTL field is not explicitly provided, the default initial TTL value of 63 may be used. Each SFF 112 involved in forwarding a service chain packet 209 must decrement the value in the TTL field by 1 prior to forwarding lookup and transmitting the service chain packet 209 to another SFF 112. In one embodiment, the SFF 112 is configured to discard the service chain packet 209, or discontinue forwarding the service chain packet 209, if the value in the TTL field is 0 upon receiving the service chain packet 209 from another SFF 112. In one embodiment, the SFF 112 is configured to discard the service chain packet 209 if the value in the TTL field is 0 after decrementing is 0.

Figure 8:
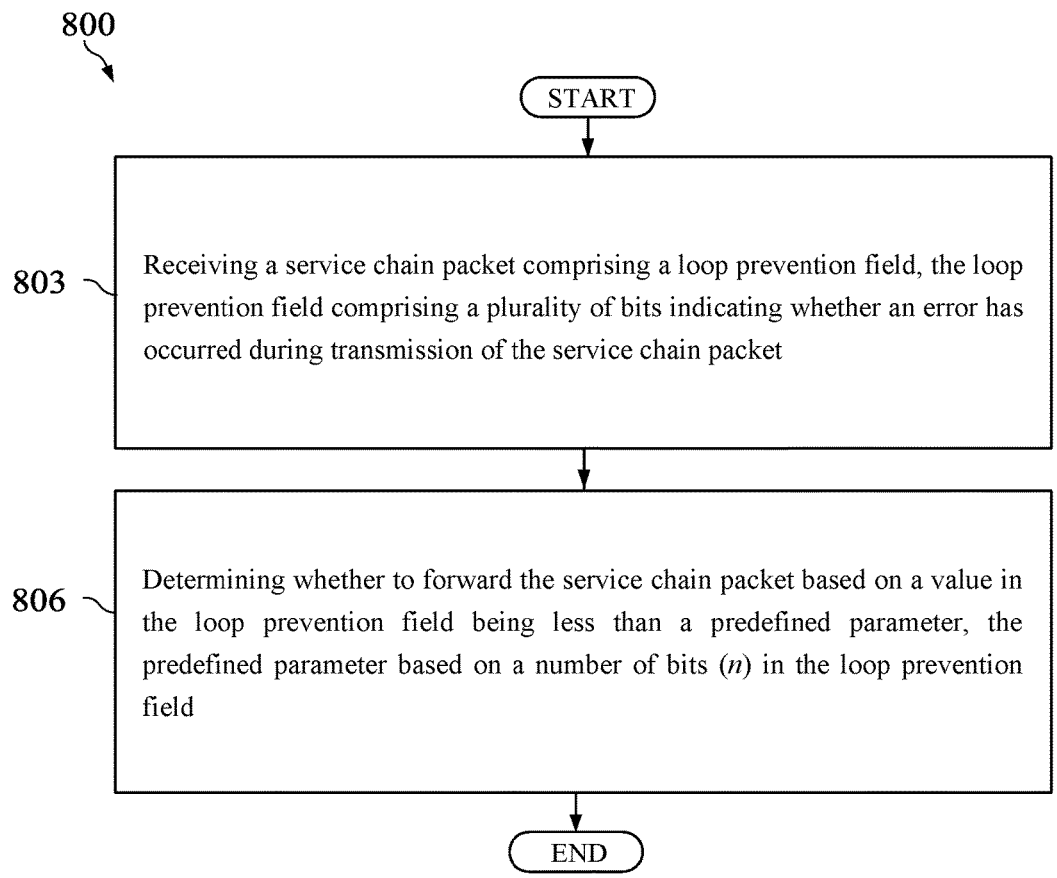
FIG. 8 is a method of loop prevention according to an embodiment of the disclosure.

FIG. 8 is a method 800 of loop prevention according to an embodiment of the disclosure. The method 800 may be implemented by the SFF 112. The method 800 may be implemented when, for example, a classifier 109 transmits a service chain packet 209 to the SFF 112 after encapsulating the data packet 206 to include the service header 212. At step 803, the SFF 112 receives the service chain packet 209 comprising a loop prevention field 220. For example, Rx 420 of SFF 112 receives the service chain packet 209. The loop prevention field 220 comprises a plurality of bits indicating whether an error has occurred during transmission of the service chain packet 209. In an embodiment where the SFF 112 receives the service chain packet 209 from the classifier 109, the value 710 in the loop prevention field 220 is 0. In an embodiment where the SFF 112 receives the service chain packet 209 from another SFF, the value 710 in the loop prevention field 220 may be greater than 0.

At step 806, the SFF 112 determines whether to forward the service chain packet 209 based on a value 710 in the loop prevention field 220 being less than a predefined parameter 490. For example, the loop prevention module 470 in the processor 430 determines whether to forward the service chain packet 209. In an embodiment, SFF 112 is configured to increment a value 710 in the loop prevention field 220 when the value 710 in the loop prevention field 220 is less than the predefined parameter 490. In an embodiment, the SFF 112 is configured to discard the service chain packet 209 when the value 710 in the loop prevention field 220 is greater than or equal to the predefined parameter 490.

Figure 9:
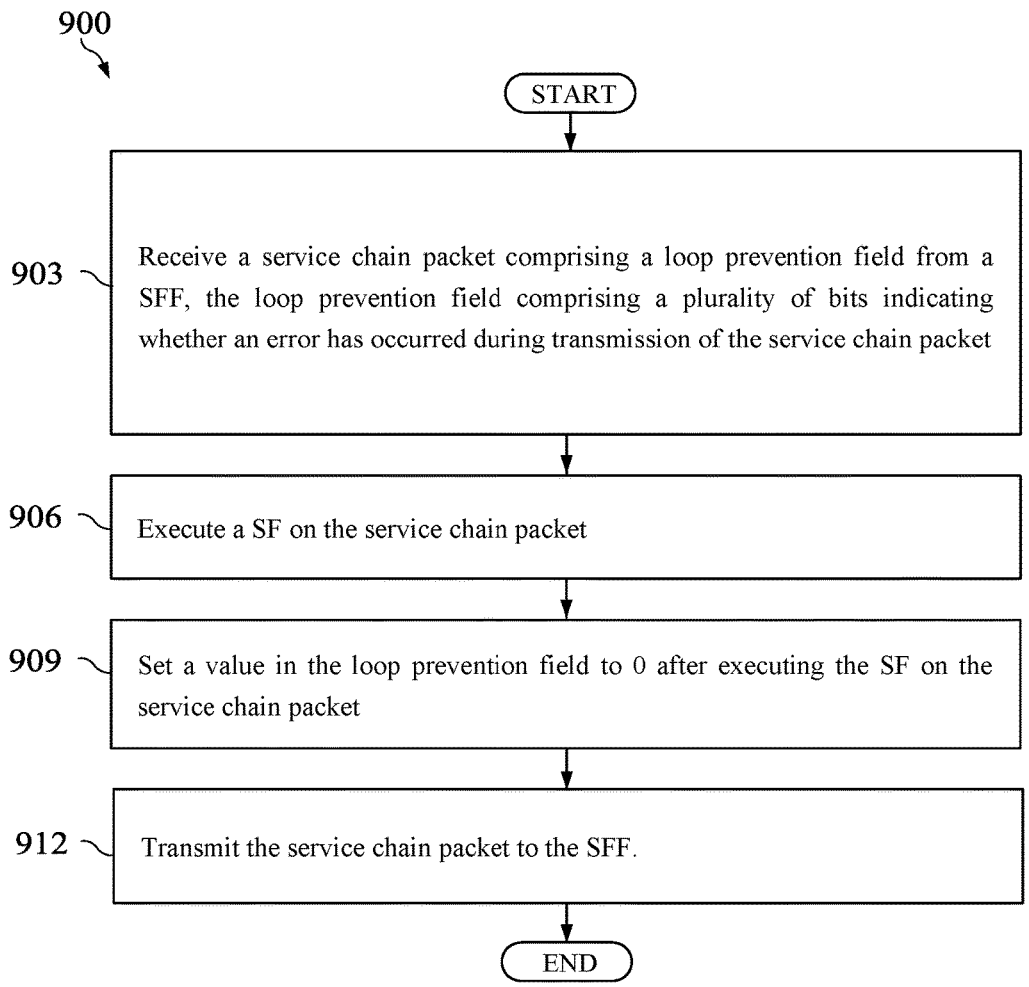
FIG. 9 is a method of loop prevention according to an embodiment of the disclosure.

FIG. 9 is a method 900 of loop prevention according to an embodiment of the disclosure. The method 900 may be implemented by SN 115. The method 900 may be implemented when, for example, an SFF 112 transmits a service chain packet 209 to the SN 115. At step 903, the SN 115 receives the service chain packet 209 comprising the loop prevention field 220 from an SFF 112. For example, the Rx 420 receives the service chain packet 209. The loop prevention field 220 comprises a plurality of bits indicating whether an error has occurred during transmission of the service chain packet 209. At step 906, the SN 115 executes an SF 121 on the service chain packet 209. For example, the loop prevention module 470 in the processor 430 of SN 115 executes an SF 121 on the data packet 206 in the service chain packet 209. At step 909, SN 115 sets a value 710 in the loop prevention field 220 to 0 after executing the SF 121 on the service chain packet 209. For example, the loop prevention module 470 in the processor 430 of SN 115 sets a value 710 in the loop prevention field 220 to 0 after executing the SF 121 on the service chain packet 209. In an embodiment, if the SF 121 is unavailable or fails to execute a network service on the service chain packet 209, the value 710 in the loop prevention field 220 remains unchanged. At step 912, the SN 115 transmits the service chain packet 209 back to the SFF 112. For example, the Tx 440 transmits the service chain packet 209 back to the SFF 112.

Figure 10:
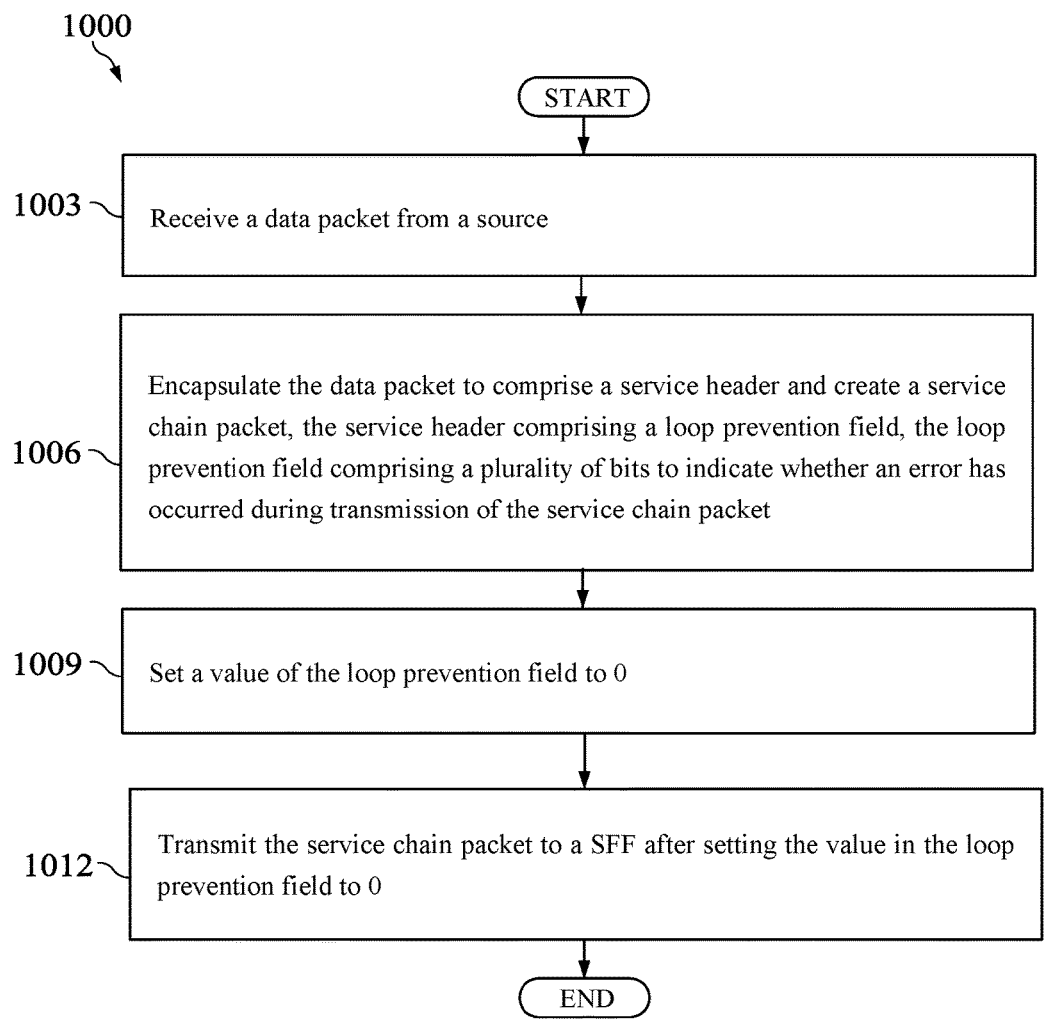
FIG. 10 is a method of loop prevention according to an embodiment of the disclosure.

FIG. 10 is a method 1000 of loop prevention according to an embodiment of the disclosure. The method 1000 may be implemented by a classifier 109. The method 1000 may be implemented when, for example, the classifier 109 receives a data packet 206 from a source 118. At step 1003, the classifier 109 receives a data packet 206 from a source 118. For example, the Rx 420 receives the data packet 206 from a source 118. At step 1006, the classifier 109 encapsulates the data packet 206 to comprise the service header 212 and create a service chain packet 209. For example, the loop prevention module 470 in the processor 430 encapsulates the data packet 206 to comprise the service header 212 and create a service chain packet 209. The service header 212 comprises the loop prevention field 220, where the loop prevention field 220 comprises a plurality of bits to indicate whether an error has occurred during transmission of the service chain packet 209. At step 1009, the classifier 109 sets a value 710 of the loop prevention field 220 to 0. For example, the loop prevention module 470 in the processor 430 sets the value 710 of the loop prevention field 220 to 0. At step 1012, the classifier 109 transmits the service chain packet 209 to a SFF 112 after setting the value 710 in the loop prevention field 220 to 0.

In an embodiment, the disclosure includes a means for receiving a service chain packet comprising a loop prevention field, the loop prevention field comprising a plurality of bits indicating whether an error has occurred during packet transmission, and determining whether to forward the service chain packet based on a value in the loop prevention field being less than a predefined parameter, the predefined parameter based on a number of bits (n) in the loop prevention field.

In an embodiment, the disclosure includes a means for receiving a service chain packet comprising a loop prevention field, the loop prevention field comprising a plurality of bits indicating whether an error has occurred during packet transmission, a means for incrementing a value in the loop prevention field when the value in the loop prevention field is less than a predefined parameter, the predefined parameter being based on a number of bits (n) in the loop prevention field, and a means for transmitting the service chain packet after incrementing the value in the loop prevention field.

In an embodiment, the disclosure includes a means for receiving a service chain packet comprising a loop prevention field, the loop prevention field comprising a plurality of bits indicating whether an error has occurred during packet transmission, and a means for discarding the service chain packet when a value in the loop prevention field is greater than or equal to a predefined parameter, the predefined parameter corresponding to a number of bits (n) in the loop prevention field.

In an embodiment, the disclosure includes a means for receiving a service chain packet comprising a loop prevention field from a SFF, the loop prevention field comprising a plurality of bits indicating whether an error has occurred during transmission of the service chain packet, a means for executing a service function on the service chain packet, a means for setting a value in the loop prevention field to 0 after executing the service function on the service chain packet, and a means for transmitting the service chain packet to the SFF.

In an embodiment, the disclosure includes a means for receiving a data packet from a source, a means for encapsulating the data packet to comprise a service header and create a service chain packet, the service header comprising a loop prevention field, the loop prevention field comprising a plurality of bits to indicate whether an error has occurred during transmission of the service chain packet, a means for setting a value of the loop prevention field to 0, and a means for transmitting the service chain packet to a SFF after setting the value of the loop prevention field to 0.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a service function forwarder (SFF), comprising:
    receiving, by a receiver of the SFF, a service chain packet comprising a loop prevention field, the loop prevention field comprising a plurality of bits indicating whether an error has occurred during packet transmission; and
    determining, by a processor of the SFF, whether to forward the service chain packet based on a value in the loop prevention field being less than a predefined parameter, the predefined parameter based on a number of bits (n) in the loop prevention field.

2. The method of claim 1, wherein the determining whether to forward the service chain packet comprises incrementing, by the processor, the value in the loop prevention field in response to determining that the value in the loop prevention field is less than the predefined parameter.

3. The method of claim 1, wherein the determining whether to forward the service chain packet discarding, by the processor, the service chain packet in response to determining that the value in the loop prevention field is greater than or equal to the predefined parameter.

4. The method of claim 1, wherein the predefined parameter is $2^{n-1}$, and wherein the loop prevention field comprises at least two bits.

5. The method of claim 1, wherein the service chain packet is further encapsulated with an overlay header comprising a Time-To-Live (TTL) field, wherein the TTL field comprises a maximum number of hops that the service chain packet is permitted to travel in an overlay network before being discarded.

6. The method of claim 5, further comprising decrementing a value in the TTL field before transmitting the service chain packet in the overlay network to a next overlay node when the value in the TTL field is greater than 0.

7. The method of claim 5, further comprising discarding the service chain packet at an overlay node when a value in the TTL field is equal to 0.

8. A service function forwarder (SFF), comprising:
a receiver configured to receive a service chain packet comprising a loop prevention field, the loop prevention field comprising a plurality of bits indicating whether an error has occurred during packet transmission; and
a processor coupled to the receiver and configured to process the service chain packet based on a value in the loop prevention field being compared to a predefined parameter, the predefined parameter being based on a number of bits (n) in the loop prevention field.

9. The SFF of claim 8, wherein the service chain packet is processed by the processor to increment the value in the loop prevention field when the value in the loop prevention field is less than the predefined parameter, and wherein the SFF further comprises a transmitter coupled to the processor and configured to transmit the service chain packet after incrementing the value in the loop prevention field.

10. The SFF of claim 8, wherein the service chain packet is processed by the processor to discard the service chain packet when the value in the loop prevention field is greater than or equal to the predefined parameter.

11. The SFF of claim 8, wherein the service chain packet is encapsulated with an overlay header comprising a Time-To-Live (TTL) field, wherein the TTL field comprises a maximum number of hops that the service chain packet is permitted to travel before being discarded by the SFF, and wherein the processor is further configured to discard the service chain packet when a value in the TTL field is equal to 0.

12. The SFF of claim 8, wherein the service chain packet is encapsulated with an overlay header comprising a Time-To-Live (TTL) field, wherein the TTL field comprises a maximum number of hops that the service chain packet is permitted to travel before being discarded, and wherein the processor is further configured to decrement a value in the TTL field before transmitting the service chain packet when the value in the TTL field is greater than 0.

13. The SFF of claim 8, wherein a header of the service chain packet comprises the loop prevention field.

14. The SFF of claim 8, wherein the predefined parameter is $2^{n-1}$, and wherein the loop prevention field comprises at least two bits.

15. The SFF of claim 8, wherein the value in the loop prevention field is 0 when the service chain packet is received from a classifier.

16. The SFF of claim 8, wherein the value in the loop prevention field is 1 when the service chain packet is received from a second SFF.

17. The SFF of claim 8, wherein the value in the loop prevention field is 0 when the service chain packet is received from a service function.

18. The SFF of claim 8, wherein the service chain packet is received from a previous SFF.

19. A service node (SN), comprising:
a receiver configured to receive a service chain packet comprising a loop prevention field from a service function forwarder (SFF), the loop prevention field comprising a plurality of bits indicating whether an error has occurred during transmission of the service chain packet;
a processor coupled to the receiver and configured to:
execute a service function on the service chain packet; and
set a value in the loop prevention field to 0 after executing the service function on the service chain packet; and
a transmitter coupled to the processor and configured to transmit the service chain packet to the SFF.

20. A classifier, comprising:
a receiver configured to receive a data packet from a source;
a processor coupled to the receiver and configured to:
encapsulate the data packet to comprise a service header and create a service chain packet, the service header comprising a loop prevention field, the loop prevention field comprising a plurality of bits to indicate whether an error has occurred during transmission of the service chain packet; and
set a value of the loop prevention field to 0; and
a transmitter coupled to the processor and configured to transmit the service chain packet to a service function forwarder (SFF) after setting the value of the loop prevention field to 0.

* * * * *